US006895467B2

(12) United States Patent
Lubbers et al.

(10) Patent No.: US 6,895,467 B2
(45) Date of Patent: May 17, 2005

(54) SYSTEM AND METHOD FOR ATOMIZING STORAGE

(75) Inventors: Clark E. Lubbers, Colorado Springs, CO (US); Keith D. Woestehoff, Monument, CO (US); Jesse L. Yandell, Colorado Springs, CO (US); James M. Reiser, Colorado Springs, CO (US); Anuja Korgaonkar, Colorado Springs, CO (US); Randy L. Roberson, New Port Richey, FL (US); Robert G. Bean, Monument, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 363 days.

(21) Appl. No.: 10/040,194

(22) Filed: Oct. 22, 2001

(65) Prior Publication Data

US 2003/0084241 A1 May 1, 2003

(51) Int. Cl.$^7$ ............................ G06F 12/00; G06F 12/14
(52) U.S. Cl. ..................... 711/114; 711/112; 711/170; 711/173
(58) Field of Search ............................ 711/112, 114, 711/154, 147, 111, 4, 170–173; 709/223

(56) References Cited

U.S. PATENT DOCUMENTS

| | | |
|---|---|---|
| 5,109,318 A | 4/1992 | Funari et al. |
| 5,184,281 A | 2/1993 | Samarov et al. |
| 5,513,314 A | 4/1996 | Kandasamy et al. |
| 5,815,371 A | 9/1998 | Jeffries et al. |
| 5,815,649 A | 9/1998 | Utter et al. |
| 5,822,777 A | 10/1998 | Leshem et al. |
| 5,832,222 A | 11/1998 | Dziadosz et al. |
| 5,835,700 A | 11/1998 | Carbonneau et al. |
| 5,987,622 A | 11/1999 | Lo Verso et al. |
| 5,996,089 A | 11/1999 | Mann et al. |
| 6,038,689 A | 3/2000 | Schmidt et al. |
| 6,073,209 A | 6/2000 | Bergsten |
| 6,148,414 A | 11/2000 | Brown et al. |
| 6,188,973 B1 | 2/2001 | Martinez et al. |
| 6,237,112 B1 | 5/2001 | Yoo et al. |
| 6,243,790 B1 * | 6/2001 | Yorimitsu ................... 711/112 |
| 6,260,120 B1 | 7/2001 | Blumenau et al. |
| 6,266,721 B1 | 7/2001 | Sheikh et al. |
| 6,278,609 B1 | 8/2001 | Suzuki et al. |
| 6,282,094 B1 | 8/2001 | Lo et al. |
| 6,282,096 B1 | 8/2001 | Lo et al. |

(Continued)

OTHER PUBLICATIONS

Smart Storage Inc., "SmartStor InfiNet™: Virtual Storage for Today's E–economy," Sep. 2000.
Compaq Computer Corporation, "The Compaq Enterprise Network Storage Architecture: An Overview," May 2000.
Compaq Computer Corporation, "Compaq Storage Works" Data Replication Manager HSG80 ACS V8.5P Operations Guide, Mar. 2000.

*Primary Examiner*—Mano Padmanabhan
*Assistant Examiner*—Jasmine Song

(57) ABSTRACT

Systems, methods and software for implementing a virtualized storage system. Physical storage is carved into units called physical segments. Logical storage is implemented in atomic logical units called RStores comprising a range of virtual address space that when allocated, is bound to a particular group of PSEGs. RStores preferably implement a selected level of data protection. A pool of physical storage devices is carved into redundant storage sets. A plurality of RStores make up a logical disk that is presented to a user. Storage access requests expressed in terms of logical disk addresses are mapped to PSEGs containing data represented by the logical addresses through a split-directory representation of the logical unit.

13 Claims, 7 Drawing Sheets

U.S. PATENT DOCUMENTS

| | | |
|---|---|---|
| 6,282,610 B1 | 8/2001 | Bergsten |
| 6,446,161 B1 * | 9/2002 | Yamamoto et al. .......... 711/114 |
| 6,647,460 B2 * | 11/2003 | Kodama ..................... 711/114 |
| 2002/0019908 A1 * | 2/2002 | Reuter et al. ............... 711/112 |
| 2002/0026558 A1 * | 2/2002 | Reuter et al. ............... 711/114 |
| 2002/0032835 A1 * | 3/2002 | Li et al. ..................... 711/114 |
| 2002/0095602 A1 * | 7/2002 | Pherson et al. ............. 713/201 |
| 2002/0099914 A1 * | 7/2002 | Matsunami et al. ........ 711/154 |
| 2003/0005248 A1 * | 1/2003 | Selkirk et al. .............. 711/165 |
| 2003/0014584 A1 * | 1/2003 | Kodama ..................... 711/112 |
| 2003/0149753 A1 * | 8/2003 | Lamb ......................... 709/223 |

* cited by examiner

| | RSS+RSSS0 | RSS+RSSS1 | RSS+RSSS2 | RSS+RSSS3 | RSS+RSSS4 | RSS+RSSS5 | RSS+RSSS6 |
|---|---|---|---|---|---|---|---|
| MEMBER 0 | DISK 0 | DISK 1 | DISK 2 | DISK 3 | DISK 4 | DISK 5 | DISK 0 |
| MEMBER 1 | DISK 1 | DISK 2 | DISK 3 | DISK 4 | DISK 5 | DISK 0 | DISK 1 |
| MEMBER 2 | DISK 2 | DISK 3 | DISK 4 | DISK 5 | DISK 0 | DISK 1 | DISK 2 |
| MEMBER 3 | DISK 3 | DISK 4 | DISK 5 | DISK 0 | DISK 1 | DISK 2 | DISK 3 |
| PARITY | DISK 4 | DISK 5 | DISK 0 | DISK 1 | DISK 2 | DISK 3 | DISK 4 |
| UNUSED | DISK 5 | DISK 0 | DISK 1 | DISK 2 | DISK 3 | DISK 4 | DISK 5 |

SYSTEM AND METHOD FOR ATOMIZING STORAGE

BACKGROUND OF THE INVENTION

1. Field of the Invention

The present invention relates, in general, to mass data storage, and, more particularly, to software, systems and methods for providing and managing virtualized data storage.

2. Relevant Background

Recent years have seen a proliferation of computers and storage subsystems. Demand for storage capacity grows by over seventy-five percent each year. Early computer systems relied heavily on direct-attached storage (DAS) consisting of one or more disk drives coupled to a system bus. More recently, network-attached storage (NAS) and storage area network (SAN) technologies are used to provide storage with greater capacity, higher reliability, and higher availability. The present invention is directed primarily at network storage systems that are designed to provide shared data storage that is beyond the ability of a single host computer to efficiently manage.

To this end, mass data storage systems are implemented in networks or fabrics that provide means for communicating data with the storage systems. Host computers or servers are coupled to the network and configured with several disk drives that cumulatively provide more storage capacity or different storage functions (e.g., data protection) than could be implemented by a DAS system. In many cases, dedicated data storage systems implement much larger quantities of data storage than would be practical for a stand-alone computer or workstation. Moreover, a server dedicated to data storage can provide various degrees of redundancy and mirroring to improve access performance, availability and reliability of stored data.

However, because the physical storage disks are ultimately managed by particular servers to which they are directly attached, many of the limitations of DAS are ultimately present in conventional SAN systems. Specifically, a server has limits on how many drives it can manage as well as limits on the rate at which data can be read from and written to the physical disks that it manages. Accordingly, server-managed SAN provides distinct advantages over DAS, but continues to limit the flexibility and impose high management costs on mass storage implementation.

A significant difficulty in providing storage is not in providing the quantity of storage, but in providing that storage capacity in a manner than enables ready, reliable access with simple interfaces. Large capacity, high availability, and high reliability storage architectures typically involve complex topologies of physical storage devices and controllers. By "large capacity" it is meant storage systems having greater capacity than a single mass storage device. High reliability and high availability storage systems refer to systems that spread data across multiple physical storage systems to ameliorate risk of data loss in the event of one or more physical storage failures. Both large capacity and high availability/high reliability systems are implemented, for example, by RAID (redundant array of independent drive) systems.

Storage management tasks, which often fall on an information technology (IT) staff, often extend across multiple systems, multiple rooms within a site, and multiple sites. This physical distribution and interconnection of servers and storage subsystems is complex and expensive to deploy, maintain and manage. Essential tasks such as backing up and restoring data are often difficult and leave the computer system vulnerable to lengthy outages.

Storage consolidation is a concept of growing interest. Storage consolidation refers to various technologies and techniques for implementing mass storage as a unified, largely self-managing utility for an enterprise. By unified it is meant that the storage can be accessed using a common interface without regard to the physical implementation or redundancy configuration. By self-managing it is meant that many basic tasks such as adapting to changes in storage capacity (e.g., adding or removing drives), creating redundancy sets, and the like are performed automatically without need to reconfigure the servers and client machines accessing the consolidated storage.

Computers access mass storage capacity using a file system implemented with the computer's operating system. A file system is the general name given to the logical structures and software routines, usually closely tied to the operating system software, that are used to control access to storage. File systems implement a mapping data structure that associates addresses used by application software to addresses used by the underlying storage layers. While early file systems addressed the storage using physical information about the hard disk(s), modern file systems address logical units (LUNs) that comprise a single drive, a portion of a drive, or more than one drive.

Modern file systems issue commands to a disk controller either directly, in the case of direct attached storage, or through a network connection, in the case of network file systems. A disk controller is itself a collection of hardware and software routines that translate the file system commands expressed in logical terms into hardware-specific commands expressed in a protocol understood by the physical drives. The controller may address the disks physically, however, more commonly a controller addresses logical block addresses (LBAs). The disk drives themselves include a controller that maps the LBA requests into hardware-specific commands that identify a particular physical location on a storage media that is to be accessed.

Despite the fact that disks are addressed logically rather than physically, logical addressing does not truly "virtualize" the storage. Presently, a user (i.e., IT manager) is required to have at least some level of knowledge about the physical storage topology in order to implement, manage and use large capacity mass storage and/or to implement high reliability/high availability storage techniques. User awareness refers to the necessity for a user of the mass storage to obtain knowledge of physical storage resources and topology in order to configure controllers to achieve a desire storage performance. In contrast, personal computer technology typically does not require user awareness to connect to storage on a local area network (LAN) as simple configuration utilities allow a user to point to the LAN storage device an connect to it. In such cases, a user can be unaware of the precise physical implementation of the LAN storage, which may be implemented in multiple physical devices and may provide RAID-type data protection.

Hence, even though the storage may appear to an end-user as abstracted from the physical storage devices, in fact the storage is dependent on the physical topology of the storage devices. A need exists for systems, methods and software that effect a true separation between physical storage and the logical view of storage presented to a user. Similarly, a need exists for systems, methods and software that merge storage management functions within the storage itself.

Storage virtualization generally refers to systems that provide transparent abstraction of storage at the block level. In essence, virtualization separates out logical data access from physical data access, allowing users to create virtual disks from pools of storage that are allocated to network-coupled hosts as logical storage when needed. Virtual storage eliminates the physical one-to-one relationship between servers and storage devices. The physical disk devices and distribution of storage capacity become transparent to servers and applications.

Virtualization can be implemented at various levels within a SAN environment. These levels can be used together or independently to maximize the benefits to users. At the server level, virtualization can be implemented through software residing on the server that causes the server to behave as if it is in communication with a device type even though it is actually communicating with a virtual disk. Server-based virtualization has limited interoperability with hardware or software components. As an example of server-based storage virtualization, Compaq offers the Compaq SANworks™ Virtual Replicator.

Compaq VersaStor™ technology is an example of fabric-level virtualization. In Fabric-level virtualization, a virtualizing controller is coupled to the SAN fabric such that storage requests made by any host are handled by the controller. The controller maps requests to physical devices coupled to the fabric. Virtualization at the fabric level has advantages of greater interoperability, but is, by itself, an incomplete solution for virtualized storage. The virtualizing controller must continue to deal with the physical storage resources at a drive level. What is needed is a virtualization system that operates at a system level (i.e., within the SAN).

Storage system architecture involves two fundamental tasks: data access and storage allocation. Data is accessed by mapping an address used by the software requesting access to a particular physical location. Hence, data access requires that a data structure or memory representation of the storage system that this mapping be available for search, which typically requires that the data structure be loaded into memory of a processor managing the request. For large volumes of storage, this mapping structure can become very large. When the mapping data structure is too large for the processor's memory, it must be paged in and out of memory as needed, which results in a severe performance penalty. A need exists for a storage system architecture that enables a memory representation for large volumes of storage using limited memory so that the entire data structure can be held in memory.

Storage allocation refers to the systems and data structures that associate particular storage resources of a physical storage device (e.g., disks or portions of disks) with a particular purpose or task. Storage is typically allocated in larger quantities, called "chunks" or "clusters", than the smallest quantity of data that can be accessed by a program. Allocation is closely tied to data access because the manner in which storage is allocated determines the size of the data structure required to access the data. Hence, a need exists for a storage allocation system that allocates storage in a manner that provides efficient data structures for accessing the data.

SUMMARY OF THE INVENTION

Systems, methods and software for implementing a virtualized storage system. Physical storage is carved into units called physical segments. Logical storage is implemented in atomic logical units called RStores comprising a range of virtual address space that when allocated, is bound to a particular group of PSEGs. RStores preferably implement a selected of data protection. A pool of physical storage devices is carved into redundant storage sets. A plurality of RStores make up a logical disk that is presented to a user. Storage access requests expressed in terms of logical disk addresses are mapped to PSEGs containing data represented by the logical addresses through a split-directory representation of the logical unit.

DETAILED DESCRIPTION OF THE PREFERRED EMBODIMENTS

The present invention generally involves a storage architecture that provides virtualized data storage at a system level, such that virtualization is implemented within a SAN. Virtualization in accordance with the present invention is implemented in a storage system controller to provide high performance, high data availability, fault tolerance, and efficient storage management. In the past, such behaviors would be implemented at the fabric or server level by, for example, hardware and software RAID controllers that would manage multiple directly attached disk drives.

In the examples used herein, the computing systems that require storage are referred to as hosts. In a typical implementation, a host is any computing system that consumes vast quantities of data storage capacity on its own behalf, or on behalf of systems coupled to the host. For example, a host may be a supercomputer processing large databases, a transaction processing server maintaining transaction records, and the like. Alternatively, the host may be a file server on a local area network (LAN) or wide area network (WAN) that provides mass storage services for an enterprise. In the past, such a host would be outfitted with one or more disk controllers or RAID controllers that would be configured to manage multiple directly attached disk drives. The host connects to the virtualized SAN in accordance with the present invention with a high-speed connection technology such as a fibre channel (FC) fabric in the particular examples. Although the host and the connection between the host and the SAN are important components of the entire system, neither the host nor the FC fabric are considered components of the SAN itself.

The present invention implements a SAN architecture comprising a group of storage cells, where each storage cell comprises a pool of storage devices called a disk group. Each storage cell comprises parallel storage controllers coupled to the disk group. The storage controllers coupled to the storage devices using a fibre channel arbitrated loop connection, or through a network such as a fibre channel fabric or the like. The storage controllers are also coupled to each other through point-to-point connections to enable them to cooperatively manage the presentation of storage capacity to computers using the storage capacity.

The present invention is illustrated and described in terms of a distributed computing environment such as an enterprise computing system using a private SAN. However, an important feature of the present invention is that it is readily scaled upwardly and downwardly to meet the needs of a particular application.

Figure 1:
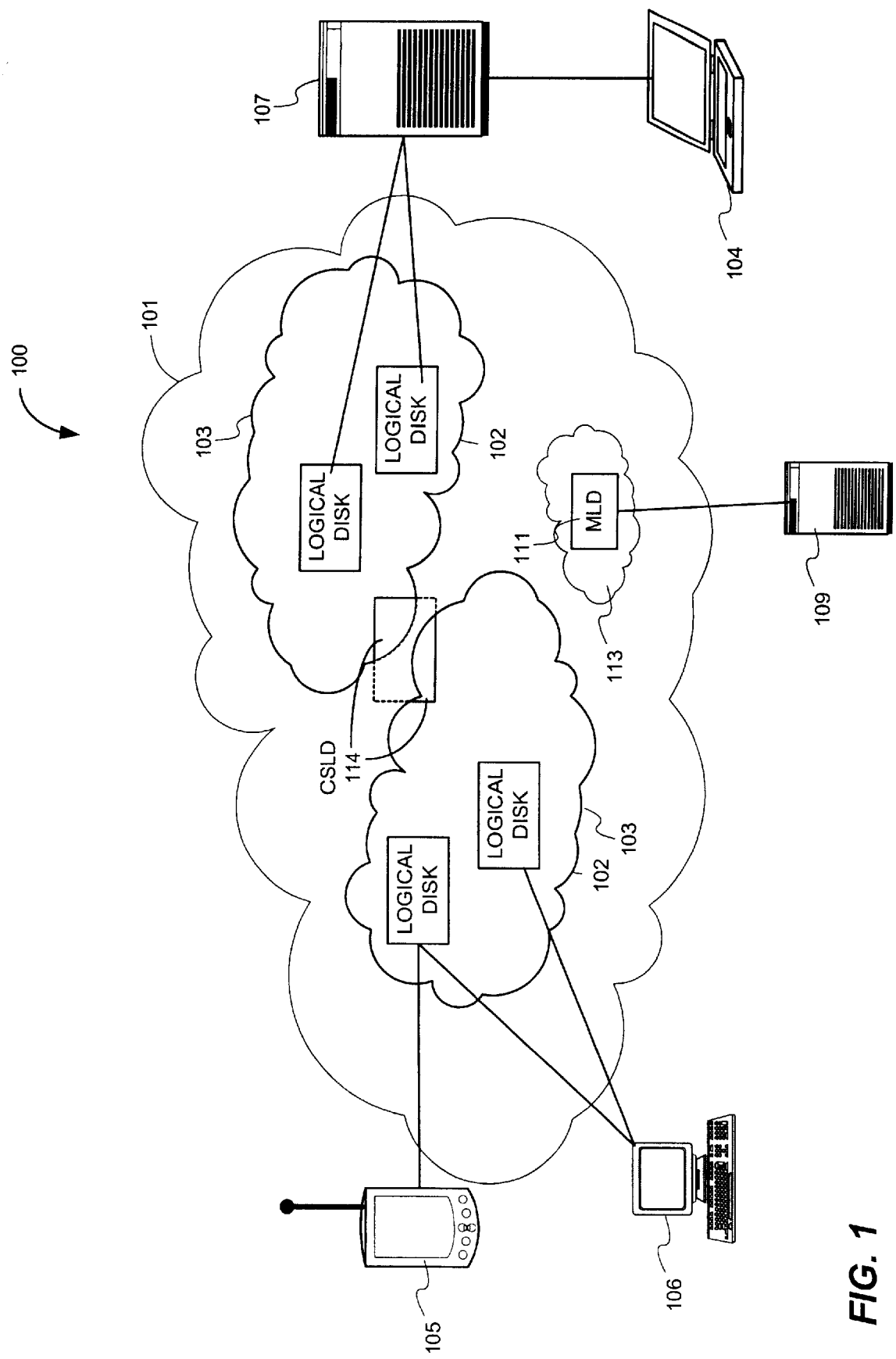
FIG. 1 shows a logical view of a networked computer environment in which the virtualized storage system in accordance with the present invention is implemented.

FIG. 1 shows a logical view of an exemplary SAN environment 100 in which the present invention may be implemented. Environment 100 shows a storage pool 101 comprising an arbitrarily large quantity of storage space from which logical disks (also called logical units or LUNs) 102 are allocated. In practice, storage pool 101 will have some finite boundaries determined by a particular hardware implementation, however, there are few theoretical limits to the size of a storage pool 101.

Within pool 101 logical device allocation domains (LDADs) 103 are defined. LDADs correspond to a set of physical storage devices from which LUNs 102 may be allocated. LUNs 102 do not span LDADs 103 in the preferred implementations. Any number of LDADs 103 may be defined for a particular implementation as the LDADs 103 operate substantially independently from each other. LUNs 102 have a unique identification within each LDAD 103 that is assigned upon creation of a LUN 102. Each LUN 102 is essential a contiguous range of logical addresses that can be addressed by host devices 105, 106, 107 and 109 by mapping requests from the connection protocol used by the hosts to the uniquely identified LUN 102.

Some hosts such as host 107 will provide services of any type to other computing or data processing systems. Devices such as client 104 may access LUNs 102 via a host such as server 107 to which they are coupled through a LAN, WAN, or the like. Server 107 might provide file services to network-connected clients, transaction processing services for a bank automated teller network, telephone call processing services and the like. Hence, client devices 104 may or may not directly use the storage consumed by host 107. It is also contemplated that devices such as computer 106 and wireless device 105, which are also hosts, may logically couple directly to LUNs 102. While the present invention is particularly directed to host systems that use large quantities of storage, it is uniquely able to provide such features as mirroring, parity protection, and striping in very small sized LUNs as well. In the past, such storage behaviors required multiple disks and so were inherently implemented with many gigabytes of storage. Hosts 105–107 may couple to multiple LUNs 102, and LUNs 102 may be shared amongst multiple hosts, although in a particular implementation each LUN 102 is presented to a specific host 105–107.

A LUN 102 comprises one or more redundant stores (RStore) which are the fundamental unit of reliable storage in the system of the present invention. An RStore comprises an ordered set of physical storage segments (PSEGs) with associated redundancy properties and is contained entirely within a single redundant store set (RSS). By analogy to conventional systems, PSEGs are analogous to disk drives and each RSS is analogous to a RAID storage set comprising a plurality of drives.

The PSEGs that implements a particular LUN 102 are spread across many, perhaps hundreds, of physical storage disks. Moreover, the physical storage capacity that a particular LUN 102 represents may be configured to implement a variety of storage types offering varying capacity, reliability and availability features. For example, some LUNs 102 may represent striped, mirrored and/or parity-protected storage. Other LUNs 102 may represent storage capacity that is configured without striping, redundancy or parity protection. As a practical consideration, the present invention limits LUNs 102 to 2 TByte capacity of any desired configuration, however, this limit can be readily extended independently of storage capacity of individual physical hard drives.

An RSS comprises a subset of physical disks in an LDAD. In preferred implementations, an RSS includes from six to eleven physical drives (which can change dynamically), and the physical drives may be of disparate capacities. Physical drives within an RSS are assigned indices (e.g., 0, 1, 2, . . . , 11) for mapping purposes. They may be further organized as pairs (i.e., adjacent odd and even indices) for RAID-1 purposes. One problem with large RAID volumes comprising many disks is that the odds of a disk failure increase significantly as more drives are added. A sixteen drive system, for example, will be twice as likely to experience a drive failure (or more critically two simultaneous drive failures), than would an eight drive system. Because data protection is spread within an RSS in accordance with the present invention, and not across multiple RSSs, a disk failure in one RSS has no effect on the availability of any other RSS. Hence, an RSS that implements data protection must suffer two drive failures within the RSS rather than two failures in the entire system. Because of the pairing in RAID-1 implementations, not only must two drives fail within a particular RSS, but a particular one of the drives within the RSS must be the second to fail (i.e. the second-to-fail drive must be paired with the first-to-fail drive). This atomization of storage sets into multiple RSSs where each RSS can be managed independently improves the performance, reliability, and availability of data throughout the system.

A SAN manager appliance 109 is coupled to a management logical disks (MLD) 111 which is a metadata container describing the logical structures used to create LUNs 102, LDADs 103, and other logical structures used by the system. A portion of the physical storage capacity available in storage pool 101 is reserved as quorum space 113 and cannot be allocated to LDADs 103, hence cannot be used to implement LUNs 102. In a particular example, each physical disk that participates in storage pool 101 has a reserved amount of capacity (e.g., the first "n" physical sectors) that are designated as quorum space 113. MLD 111 is mirrored in this quorum space of multiple physical drives and so can be accessed even if a drive fails. In a particular example, at least one physical drive is associated with each LDAD 103 includes a copy of MLD 111 (designated a "quorum drive"). SAN management appliance 109 may wish to associate information such as name strings for LDADs 103 and LUNs 102, and timestamps for object birthdates. To facilitate this behavior, the management agent uses MLD 111 to store this information as metadata. MLD 111 is created implicitly upon creation of each LDAD 103.

Quorum space 113 is used to store information including physical store ID (a unique ID for each physical drive), version control information, type (quorum/non-quorum), RSS ID (identifies to which RSS this disk belongs), RSS Offset (identifies this disk's relative position in the RSS), Storage Cell ID (identifies to which storage cell this disk belongs), PSEG size, as well as state information indicating whether the disk is a quorum disk, for example. This metadata PSEG also contains a PSEG free list for the entire physical store, probably in the form of an allocation bitmap. Additionally, quorum space 113 contains the PSEG allocation records (PSARs) for every PSEG on the physical disk. The PSAR comprises a PSAR signature, Metadata version, PSAR usage, and an indication a RSD to which this PSEG belongs.

CSLD 114 is another type of metadata container comprising logical drives that are allocated out of address space within each LDAD 103, but that, unlike LUNs 102, span multiple LDADs 103. Preferably, each LDAD 103 includes space allocated to CSLD 114. CSLD 114 holds metadata describing the logical structure of a given LDAD 103, including a primary logical disk metadata container (PLDMC) that contains an array of descriptors (called RSDMs) that describe every RStore used by each LUN 102 implemented within the LDAD 103. The CSLD 111 implements metadata that is regularly used for tasks such as disk creation, leveling, RSS merging, RSS splitting, and regeneration. This metadata includes state information for each physical disk that indicates whether the physical disk is "Normal" (i.e., operating as expected), "Missing" (i.e., unavailable), "Merging" (i.e., a missing drive that has reappeared and must be normalized before use), "Replace" (i.e., the drive is marked for removal and data must be copied to a distributed spare), and "Regen" (i.e., the drive is unavailable and requires regeneration of its data to a distributed spare).

A logical disk directory (LDDIR) data structure in CSLD 114 is a directory of all LUNs 102 in any LDAD 103. An entry in the LDDS comprises a universally unique ID (UUID) an RSD indicating the location of a Primary Logical Disk Metadata Container (PLDMC) for that LUN 102. The RSD is a pointer to the base RSDM or entry point for the corresponding LUN 102. In this manner, metadata specific to a particular LUN 102 can be accessed by indexing into the LDDIR to find the base RSDM of the particular LUN 102. The metadata within the PLDMC (e.g., mapping structures described hereinbelow) can be loaded into memory to realize the particular LUN 102.

Hence, the present invention implements multiple forms of metadata that can be used for recovery. The CSLD 111 implements metadata that is regularly used for tasks such as disk creation, leveling, RSS merging, RSS splitting, and regeneration. The PSAR metadata held in a known location on each disk contains metadata in a more rudimentary form that is not mapped into memory, but can be accessed when needed from its known location to regenerate all metadata in the system.

Each of the devices shown in FIG. 1 may include memory, mass storage, and a degree of data processing capability sufficient to manage a network connection. The computer program devices in accordance with the present invention are implemented in the memory of the various devices shown in FIG. 1 and enabled by the data processing capability of the devices shown in FIG. 1.

To understand the scale of the present invention, it is contemplated that an individual LDAD 103 may correspond to from as few as four disk drives to as many as several thousand disk drives. In particular examples, a minimum of eight drives per LDAD is required to support RAID-1 within the LDAD 103 using four paired disks. LUNs 102 defined within an LDAD 103 may represent a few megabytes of storage or less, up to 2 TByte of storage or more. Hence, hundreds or thousands of LUNs 102 may be defined within a given LDAD 103, and thus serve a large number of storage needs. In this manner a large enterprise can be served by a single storage pool 101 providing both individual storage dedicated to each workstation in the enterprise as well as shared storage across the enterprise. Further, an enterprise may implement multiple LDADs 103 and/or multiple storage pools 101 to provide a virtually limitless storage capability. Logically, therefore, the virtual storage system in accordance with the present invention offers great flexibility in configuration and access.

Figures 2, 3:
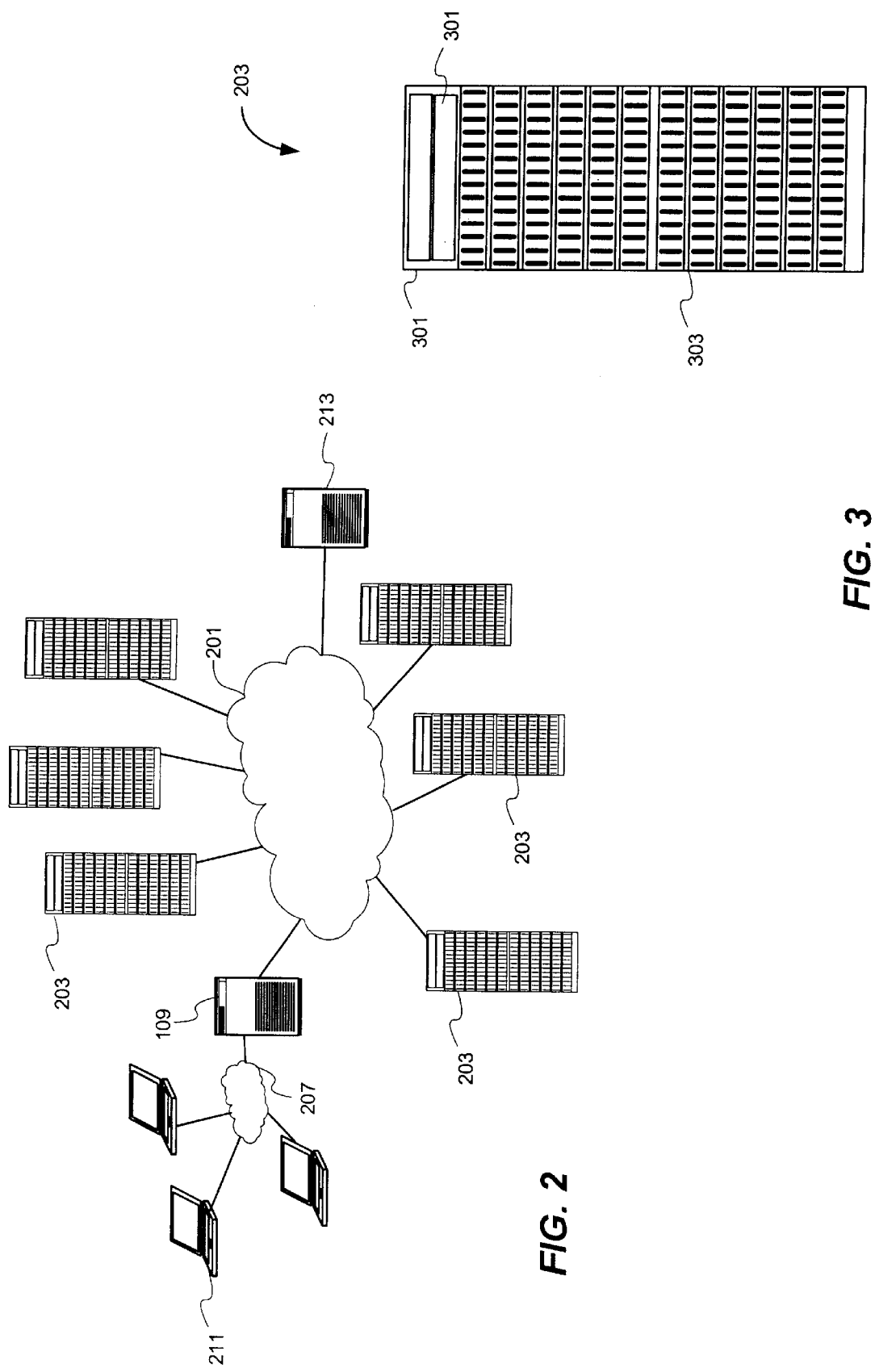
FIG. 2 illustrates a physical view of of a networked computer environment in which the virtualized storage system in accordance with the present invention is implemented.
FIG. 3 illustrates a storage cell shown in FIG. 2 in greater detail.

FIG. 2 illustrates a physical implementation of virtualized storage in accordance with the present invention. Network 201, such as a fibre channel fabric, interconnects a plurality of storage cells 203. Storage cells 203 are accessible through fabric 201, or by management appliance 109 through LANs/WANs 207. Storage cells 203 essentially implement a storage pool 101. The number of storage cells that can be included in any SAN is primarily limited by the connectivity implemented by fabric 201. A fabric comprising even a single fibre channel switch can interconnect 256 or more ports, providing a possibility of hundreds of storage cells 203 in a single storage pool 101.

Host 213 includes adapter hardware and software to enable a connection to fabric 201. The connection to fabric 201 may be through an optical coupling or more conventional conductive cabling depending on the bandwidth requirements. A host adapter will often be implemented as a plug-in card on a host computer system. A host 213 may implement any number of host adapters to provide as many connections to fabric 213 as the hardware and software support.

As shown in FIG. 3, each storage cell 203 in the preferred embodiment comprises a pair of network storage controllers (NSCs) 301 coupled by a fibre channel arbitrated loop (FCAL) to a plurality of hard disks located in disk cabinet 303. NSC 301 implements a network interface to receive storage access requests from hosts as well as fibre channel arbitrated loop ports to connect to storage device in cabinet 303. NSCs 301 are coupled together over a high-speed connection such as a fibre channel point-to-point connection. While the particular embodiments are illustrated with fibre channel communication links, any communication protocol and hardware that provides sufficient bandwidth for a particular application may be used, including proprietary hardware and protocols.

Figure 4:
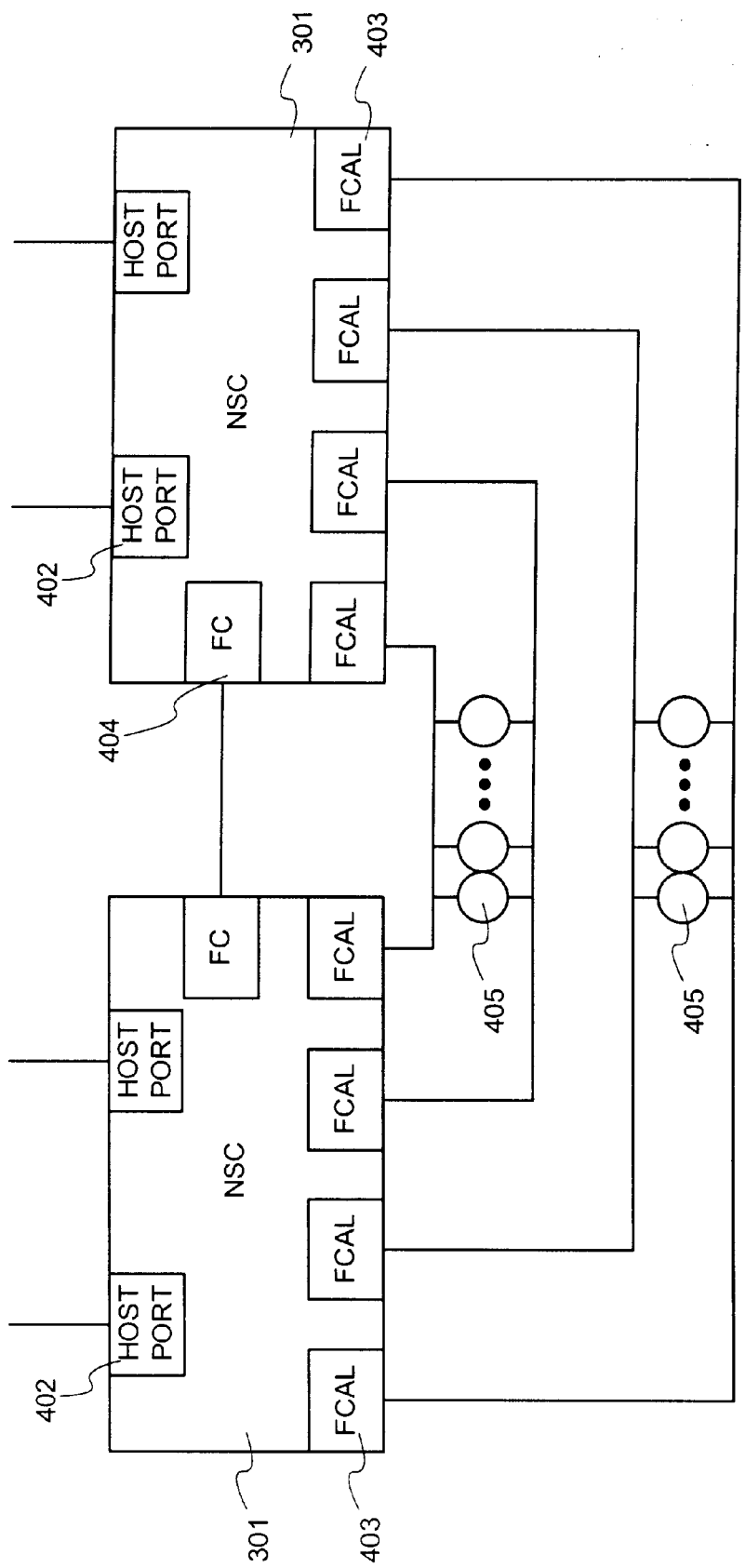
FIG. 4 shows a functional block-diagram of components of an alternative embodiment storage cell.

FIG. 4 illustrates a functional model of a storage cell 203 in greater detail. In the example of FIG. 4, storage cell 203 includes NSCs 401 to provide redundancy. NSCs 301 are implemented microcomputers having a microprocessor and memory, as well as a plurality of fibre channel ports 402, 403 and 404. Host adapter ports 402 provide an interface to fabric 201 (shown in FIG. 2) and are implemented as FC N_Ports in a particular example. Each Host adapter port handles login to fabric 201, and is assigned a fabric-unique port ID in the login process. Dual host port connections on each NSC provide redundancy.

Any number of FCAL ports 403 may be implemented in each NSC 301, although four FCAL ports 403 per NSC 401 are used in the exemplary implementation. FCAL ports 403 are used to connect to drives 405 which comprise fiber channel drives. It should be understood that a variety of configurations are possible. For example, rather than an FCAL configuration, a fibre channel fabric using a switch could be used to couple to drives 405. The particular FCAL implementation shown allows up to 120 drives in each of two FCAL loops (240 drives per storage cell 203), where each loop is accessible by either NSC 301 to provide redundant connectivity. As each drive 405 may implement from 10 GB to 100 GB or more of storage capacity, a single storage cell 203 may implement vast quantities of storage. All of the storage that is accessible through a particular pair of NSCs 403 is considered to be within the storage pool 101 in which LDADs 103 can be implemented. While a SAN may include multiple storage cells 203, each cell 203 essentially implements and independent storage pool 101.

Each disk drive 405 is represented as a plurality of equal-sized physical segments. In a particular example, each physical segment (PSEG) comprises 4096 contiguous sectors, or 2 Mbyte of storage capacity. A 20 Gbyte drive will, therefore, provide 10K PSEGs, whereas an 80 Gbyte drive will provide 80K PSEGs. By decomposing physical drives into uniform-sized atomic units (PSEGs), the system can use PSEGs in a manner akin to how prior systems used drives. Essentially, PSEGs are treated as an atomic unit of storage rather than a physical drive. Because of this, the processes that manipulate data to, for example, implement parity, mirroring, striping, leveling, failure recovery and the like operate on much smaller units (PSEGs) rather than on entire drives as was done in the past. PSEGs are allocated to a particular storage task rather than drives. This atomicity increases the granularity with which the physical storage resources can be applied to a particular task, resulting in an increased flexibility in implementation of a particular LUN 102.

Specifically, drives 405 within a given storage cell 203 may vary in capacity as the present invention includes mechanisms that efficiently use all storage capacity. Moreover, drives 405 that are involved in the implementation of a particular LUN 102 may vary in capacity while at the same time efficiently using the disk capacity. This allows great flexibility in populating drives 405 so that the most cost and performance efficient drives can be selected at any given time, and storage capacity can grow or shrink incrementally without requiring replacement of drives 405.

Figure 5:
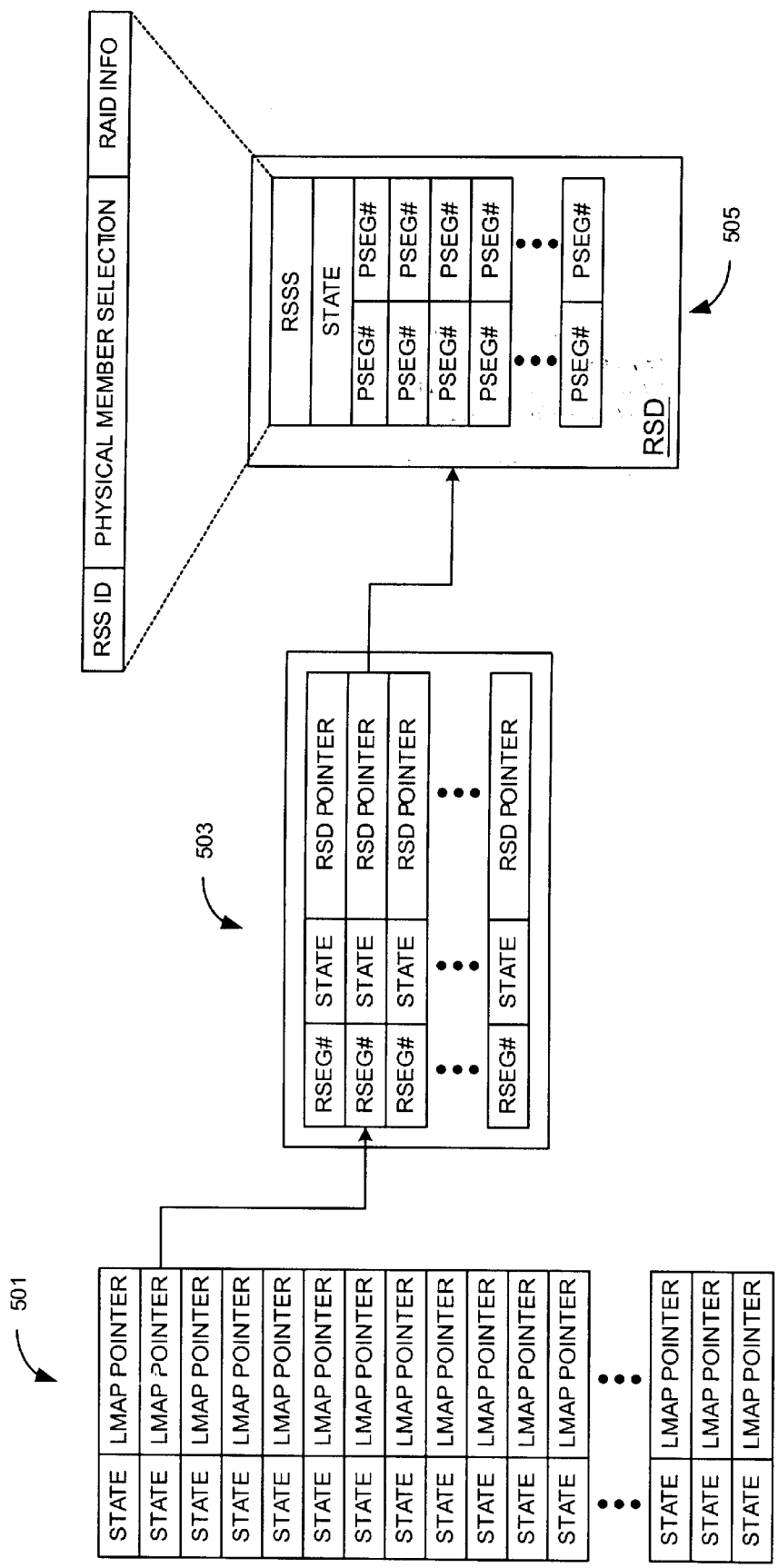
FIG. 5 depicts data structures implementing an in-memory representation of a storage system in accordance with the present invention.

Returning now to the issues of allocating storage capacity to particular tasks, FIG. 5 illustrates and exemplary memory representation of a LUN 102 in accordance with an embodiment of the present invention. A memory representation is essentially a mapping structure that is implemented in memory of a NSC 401 that enables translation of a request expressed in terms of a logical block address (LBA) from host 301 into a read/write command addressed to a particular portion of a physical disk 405 having the desired information. A memory representation desirably is small enough to fit into a reasonable amount of memory so that it can be readily accessed in operation with minimal or no requirement to page the memory representation into and out of the NSC's memory.

The memory representation of the present invention is described in terms of a system that enables each LUN 102 to implement from 1 Mbyte to 2 TByte in storage capacity. Larger storage capacities per LUN 102 are contemplated, however, for purposes of illustration a 2 Tbyte maximum is used in this description. Further, the memory representation enables each LUN 102 to be defined with any type of RAID data protection, including multi-level RAID protection, as well as supporting no redundancy at all. Moreover, multiple types of RAID data protection may be implemented within a single LUN 102 such that a first range of logical disk addresses (LDAs) correspond to unprotected data, and a second set of LDAs within the same LUN 102 implement RAID 5 protection. Hence, the data structures implementing the memory representation must be flexible to handle this variety, yet efficient such that LUNs 102 do not require excessive data structures.

A persistent copy of the memory representation shown in FIG. 5 is maintained in the PLDMDC for each LUN 102 described hereinbefore. The memory representation of a particular LUN 102 is realized when the system reads metatada contained in the quorum space 113 to obtain a pointer to the corresponding PLDMDC, then retrieves the PLDMDC and loads an level 2 map (L2MAP) 502. This is performed for every LUN 102, although in ordinary operation this would occur once when a LUN 102 was created, after which the memory representation will live in memory as it is used.

A logical disk mapping layer maps a LDA specified in a request to a specific RStore as well as an offset within the RStore. Referring to the embodiment shown in FIG. 5, the present invention is implemented using an L2MAP 501, an LMAP 503, and a redundancy set descriptor (RSD) 505 as the primary structures for mapping a logical disk address to physical storage location(s) represented by that address. The mapping structures shown in FIG. 5 are implemented for each LUN 102. A single L2MAP handles the entire LUN 102. Each LUN 102 is represented by multiple LMAPs 503 where the particular number of LMAPs 503 depend on the actual address space that is allocated at any given time. RSDs 505 also exist only for allocated storage space. Using this split directory approach, a large storage volume that is sparsely populated with allocated storage, the structure shown in FIG. 5 efficiently represents the allocated storage while minimizing data structures for unallocated storage.

L2MAP 501 includes a plurality of entries where each entry represents 2 Gbyte of address space. For a 2 Tbyte LUN 102, therefore, L2MAP 501 includes 1024 entries to cover the entire address space in the particular example. Each entry may include state information corresponding to the corresponding 2 Gbyte of storage, and a pointer a corresponding LMAP descriptor 503. The state information and pointer are only valid when the corresponding 2 Gbyte of address space have been allocated, hence, some entries in L2MAP 501 will be empty or invalid in many applications.

The address range represented by each entry in LMAP 503, is referred to as the logical disk address allocation unit (LDAAU). In the particular implemenation, the LDAAU is 1 MByte. An entry is created in LMAP 503 for each allocated LDAAU irrespective of the actual utilization of storage within the LDAAU. In other words, a LUN 102 can grow or shrink in size in increments of 1 Mbyte. The LDAAU is represents the granularity with which address space within a LUN 102 can be allocated to a particular storage task.

An LMAP 503 exists only for each 2 Gbyte increment of allocated address space. If less than 2 Gbyte of storage are used in a particular LUN 102, only one LMAP 503 is required, whereas, if 2 Tbyte of storage is used, 1024 LMAPs 503 will exist. Each LMAP 503 includes a plurality of entries where each entry optionally corresponds to a redundancy segment (RSEG). An RSEG is an atomic logical unit that is roughly analogous to a PSEG in the physical domain—akin to a logical disk partition of an RStore. In a particular embodiment, an RSEG is a logical unit of storage that spans multiple PSEGs and implements a selected type of data protection. Entire RSEGs within an RStore are bound to contiguous LDAs in a preferred implementation. In order to preserve the underlying physical disk performance for sequential transfers, it is desirable to adjacently locate all RSEGs from an RStore in order, in terms of LDA space, so as to maintain physical contiguity. If, however, physical resources become scarce, it may be necessary to spread RSEGs from RStores across disjoint areas of a LUN 102. The logical disk address specified in a request 501 selects a particular entry within LMAP 503 corresponding to a particular RSEG that in turn corresponds to 1 Mbyte address space allocated to the particular RSEG#. Each LMAP entry also includes state information about the particular RSEG, and an RSD pointer.

Optionally, the RSEG#s may be omitted, which results in the RStore itself being the smallest atomic logical unit that can be allocated. Omission of the RSEG# decreases the size of the LMAP entries and allows the memory representation of a LUN 102 to demand fewer memory resources per MByte of storage. Alternatively, the RSEG size can be increased, rather than omitting the concept of RSEGs altogether, which also decreases demand for memory resources at the expense of decreased granularity of the atomic logical unit of storage. The RSEG size in proportion to the RStore can, therefore, be changed to meet the needs of a particular application.

The RSD pointer points to a specific RSD 505 that contains metadata describing the RStore in which the corresponding RSEG exists. As shown in FIG. 5, the RSD includes a redundancy storage set selector (RSSS) that includes a redundancy storage set (RSS) identification, a physical member selection, and RAID information. The physical member selection is essentially a list of the physical drives used by the RStore. The RAID information, or more generically data protection information, describes the type of data protection, if any, that is implemented in the particular RStore. Each RSD also includes a number of fields that identify particular PSEG numbers within the drives of the physical member selection that physically implement the corresponding storage capacity. Each listed PSEG# corresponds to one of the listed members in the physical member selection list of the RSSS. Any number of PSEGs may be included, however, in a particular embodiment each RSEG is implemented with between four and eight PSEGs, dictated by the RAID type implemented by the RStore.

In operation, each request for storage access specifies a LUN 102, and an address. A NSC 301 maps the logical drive specified to a particular LUN 102, then loads the L2MAP 501 for that LUN 102 into memory if it is not already present in memory. Preferably, all of the LMAPs and RSDs for the LUN 102 are loaded into memory as well. The LDA specified by the request is used to index into L2MAP 501, which in turn points to a specific one of the LMAPs. The address specified in the request is used to determine an offset into the specified LMAP such that a specific RSEG that corresponds to the request-specified address is returned. Once the RSEG# is known, the corresponding RSD is examined to identify specific PSEGs that are members of the redundancy segment, and metadata that enables a NSC 401 to generate drive specific commands to access the requested data. In this manner, an LDA is readily mapped to a set of PSEGs that must be accessed to implement a given storage request.

The L2MAP consumes 4 Kbytes per LUN 102 regardless of size in an exemplary implementation. In other words, the L2MAP includes entries covering the entire 2 Tbyte maximum address range even where only a fraction of that range is actually allocated to a LUN 102. It is contemplated that variable size L2MAPs may be used, however such an implementation would add complexity with little savings in memory. LMAP segments consume 4 bytes per Mbyte of address space while RSDs consume 3 bytes per MB. Unlike the L2MAP, LMAP segments and RSDs exist only for allocated address space.

Figure 6:
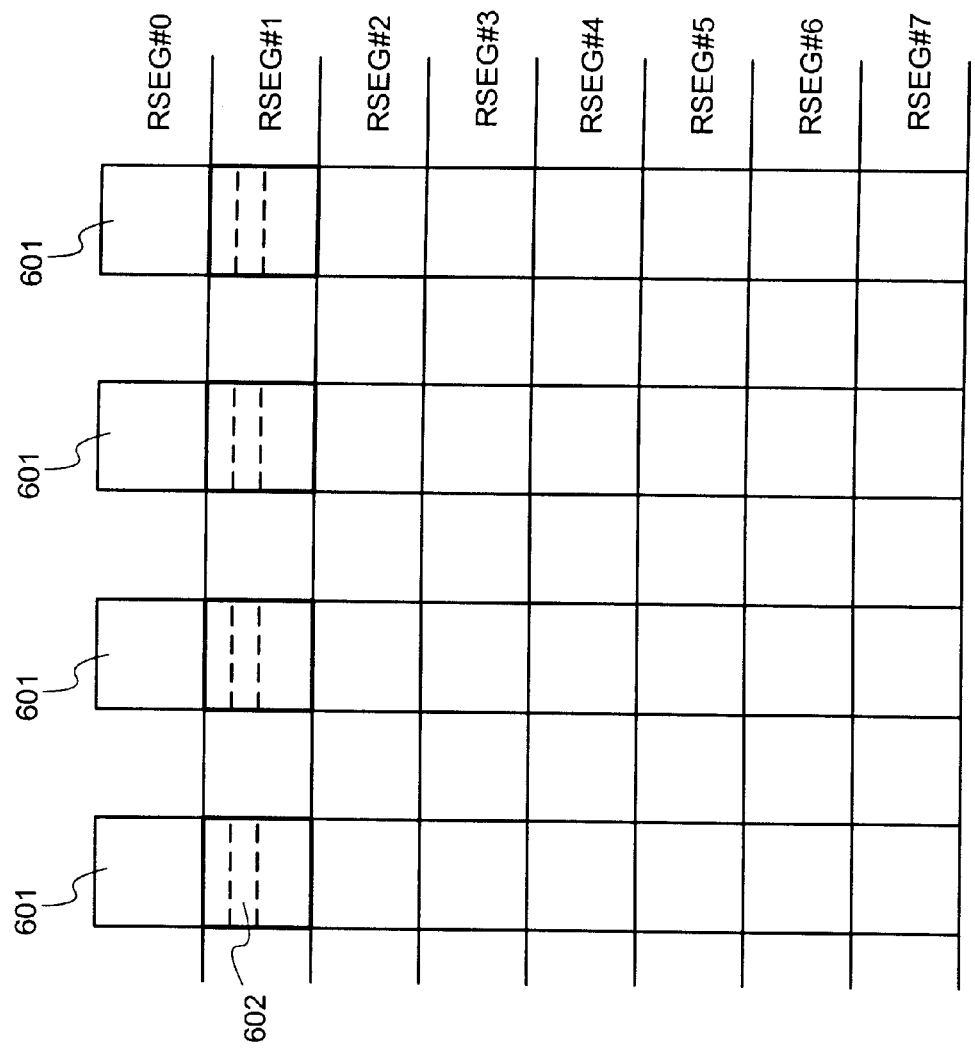
FIG. 6 illustrates atomic physical and logical data storage structures in accordance with the present invention.

As shown in FIG. 6, a redundancy layer selects PSEGs 601 based on the desired protection and subject to NSC data organization rules, and assembles them to create Redundant Stores (RStores). The set of PSEGs that correspond to a particular redundant storage set are referred to as an "RStore". Data protection rules may require that the PSEGs within an RSTORE are located on separate disk drives, or within separate enclosure, or at different geographic locations. Basic RAID-5 rules, for example, assume that striped data involve striping across independent drives. However, since each drive comprises multiple PSEGs, the redundancy layer of the present invention ensures that the PSEGs are selected from drives that satisfy desired data protection criteria, as well as data availability and performance criteria.

RStores are allocated in their entirety to a specific LUN 102. RStores may be partitioned into 1 Mbyte segments (RSEGs) as shown in FIG. 6. Each RSEG in FIG. 6 presents only 80% of the physical disk capacity consumed as a result of storing a chunk of parity data in accordance with RAID 5 rules. When configured as a RAID 5 storage set, each RSTORE will comprise data on four PSEGs, and parity information on a fifth PSEG (not shown) similar to RAID4 storage. The fifth PSEG does not contribute to the overall storage capacity of the RStore, which appears to have four PSEGs from a capacity standpoint. Across multiple RStores the parity will fall on various of various drives so that RAID 5 protection is provided.

RStores are essentially a fixed quantity (8 MByte in the examples) of virtual address space. RStores consume from four to eight PSEGs in their entirety depending on the data protection level. A striped RStore without redundancy consumes 4 PSEGs (4–2048 KByte PSEGs=8 MB), an RStore with 4+1 parity consumes 5 PSEGs and a mirrored RStore consumes eight PSEGs to implement the 8 Mbyte of virtual address space.

An RStore is analogous to a RAID disk set, differing in that it comprises PSEGs rather than physical disks. An RStore is smaller than conventional RAID storage volumes, and so a given LUN 102 will comprise multiple RStores as opposed to a single RAID storage volume in conventional systems.

It is contemplated that drives 405 may be added and removed from an LDAD 103 over time. Adding drives means existing data can be spread out over more drives while removing drives means that existing data must be migrated from the exiting drive to fill capacity on the remaining drives. This migration of data is referred to generally as "leveling". Leveling attempts to spread data for a given LUN 102 over as many physical drives as possible. The basic purpose of leveling is to distribute the physical allocation of storage represented by each LUN 102 such that the usage for a given logical disk on a given physical disk is proportional to the contribution of that physical volume to the total amount of physical storage available for allocation to a given logical disk.

Existing RSTOREs can be modified to use the new PSEGs by copying data from one PSEG to another and then changing the data in the appropriate RSD to indicate the new membership. Subsequent RStores that are created in the RSS will use the new members automatically. Similarly, PSEGs can be removed by copying data from populated PSEGs to empty PSEGs and changing the data in LMAP 502 to reflect the new PSEG constituents of the RSD. In this manner, the relationship between physical storage and logical presentation of the storage can be continuously managed and updated to reflect current storage environment in a manner that is invisible to users.

Figure 7:
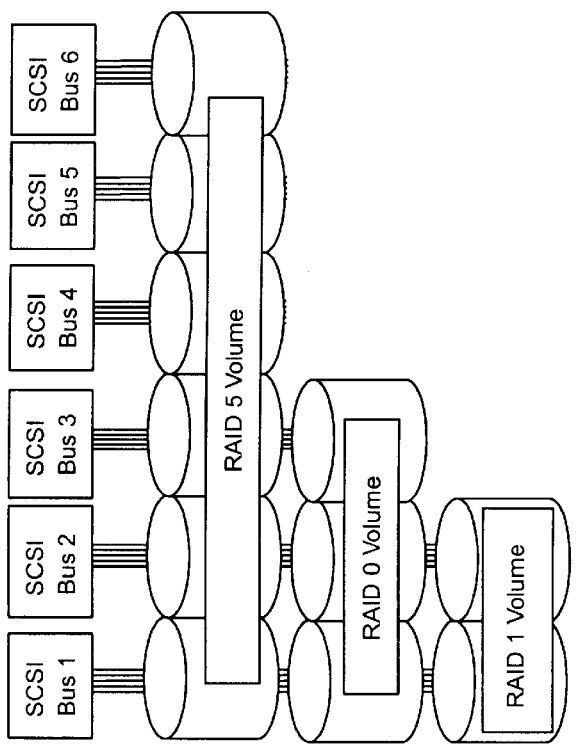
FIG. 7 shows a prior art storage system implementing multiple types of data protection.

The effect of atomization of the storage capacity into PSEGs and RSEGs is apparent in an implementation with multiple volumes of different RAID configuration shown in FIG. 7. In a conventional system, a first controller manages a RAID-5 volume spreading data and parity over several physical disks to provide data protection. A second controller is used to implement RAID-level 0 striping to improve write performance without data protection. Yet a third controller may be used to provide mirroring through RAID-1 mechanisms. The physical disk resources are deployed inefficiently, and configuration and management of the array is complex and problematic. Management of any given volume is highly dependent on the capacity and performance of the disk drives that make up that volume.

Figure 8:
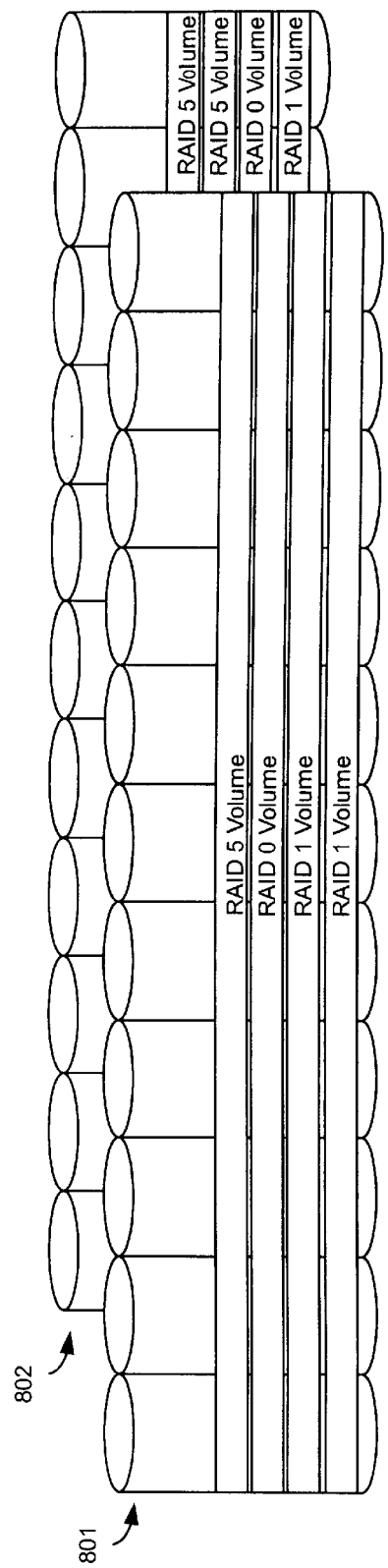
FIG. 8 shows a storage system in accordance with the present invention implementing multiple types of data protection.

In contrast, the present invention divides the disks into a plurality of PSEGs and forms volumes from any of the available PSEGs. As illustrated in FIG. 8, PSEGS from each of the total pool of physical drives may participate in any or all of the storage volumes despite the volumes having different RAID characteristics. LDAD 801 implements a RAID 5, RAID 0, and two RAID 1 LUNS, with LDAD 802 implementing two RAID 5, a RAID 0, and RAID 1 volume to implement storage of equivalent protection to that shown in FIG. 7. However, the implementation of FIG. 8 spreads the data evenly over all disks in the LDADs 801 and 802.

This is further apparent in multilevel or nested RAID level implementations. In conventional systems, a sophisticated controller may implement, for example, RAID 50 by combining the block striping an parity of RAID 5 with the straight block striping of RAID 0. These nested systems have very rigid requirements for the number of disks that must participate in a storage set. For example, the number of drives must be able to be factored into two integers, one of which must be 2 or higher and the other 3 or higher (i.e., a RAID 50 set can be made from 6 drives, but not 7). These constraints, as well as increased importance for all drives to have the same physical size, greatly constrain building, growing, and shrinking the capacity of a given LUN 102.

A six drive RAID 50 volume, for example, cannot be reduced in size without replacing all of the drives with smaller drives. To increase size, two entire drives must be added, making the incremental increase in storage capacity in the order of tens of Gbytes in most cases. Also, it is often difficult to find drives matching capacity of the existing drives in a RAID 50 array. Hence, the increment may be implemented with larger capacity drives and the resulting excess capacity simply wasted.

In contrast, by using the atomic logical structure of an RStore/RSEG, the present invention shown in FIG. 8 can readily form a nested RAID set using, for example, increments of RStores rather than increments of six drives. Since all RStores are by definition the same size, the combination will be efficient. Because RStores are much smaller than typical drives, the granularity with which capacity can be added and removed from a LUN 102 is greatly improved. A LUN 102 can be incremented by adding an RStore and consume as little as 8 Mbyte of additional capacity. More significantly, the new capacity can be implemented from unallocated PSEGs in the storage pool such that there typically is no need to actually install drives. Hence, the capacity can be added (or reduced) "on-the-fly".

The use of PSEGs to form RStores is not unconstrained. RAID data mapping typically requires that the PSEGs be located on different physical drives to provide the expected data protection. For example, parity data protection provides a method of recovering from a single drive failure. However, if two PSEGs of an RStore were located on a single drive, a failure of that drive would be tantamount to two drive failures, and would not be recoverable using only parity protection.

Figures 9, 10A, 10B:
FIG. 9 illustrates a process for binding logical storage entities to physical storage in accordance with an embodiment of the present invention.
FIG. 10A and FIG. 10B illustrate a method for determining capacity of RAID volumes in accordance with an embodiment of the present invention.

Hence, the allocation mechanisms of the present invention takes into account these requirements when associating PSEGs to RStores. RStores are defined from a redundant storage set (RSS), which contains an ordered list of physical drives. A LUN 102 will comprise a number of RStores in most cases. FIG. 9 illustrates an exemplary implementation involving an RSS having six members (i.e., six physical disk drives). Although larger numbers of disks can be used, six is adequate for purposes of example. To configure a RAID 5 volume from the six drives, four data members (indicated as Member0 through Member 3 in FIG. 9), are defined. A fifth row in FIG. 9 indicates a parity member.

As noted before, an RSS is managed to contain between six and eleven drives. Hence, each RStore will not use one of the drives in the 6-drive RAID-5 example above, as suggested by the "unused" row in FIG. 7. Significantly, all of the disks in the RSS are used as subsequent RStores are formed. In contrast, it would be extremely difficult, if not impossible, to use the 6th disk in a conventional RAID-5 configuration, except for sparing. Moreover, the RSS can be used for various types of data protection so long as the RSS contains the minimum number of disks for that data protection level. In the 6-disk example above, RAID-0, RAID-4, and RAID-5 RStores can be formed, for example. Conventional RAID systems allow only one type of data protection to be implemented across the entire disk set.

Each column in FIG. 9 illustrates the membership for an RStore. The membership is selected in a round-robin fashion such that the first RStore will have a PSEG selected from disk 0 as a member 0, a PSEG selected from Disk 1 as member 1, and so forth. The next RStore that is defined uses the mapping in the second column of FIG. 9. In effect, the parity is spread across drives between RStores resulting in a true RAID-5 protection. Any number of RStores can be defined in this manner, and PSEGs are selected for any given RStore to meet the requirement of a given data protection scheme.

The round-robin technique described in reference to FIG. 9 is suitable for many applications, but limits the utilization of storage capacity unless all drives are the same size. This is because when all of the PSEGs of a small drive are consumed, the drive can no longer participate in striping. In such cases the RSS can be expanded by adding another drive, but the present invention contemplates a more elegant mechanism for improving utilization.

Thus, to allocate storage space in a leveled manner, for a given LUN it is important to accurately determine the actual capacity of all the disks that is eligible for all redundancy types. As there is no restriction on the number of drives used for striping, all of the drive capacity can be used for allocation. Hence, the eligible RAID-0 capacity is the actual size. However, for RAID-1 RStores, drives must be used in pairs and an odd, unpaired drive can not participate in a RAID-1 RStore. Thus, the eligible RAID-1 capacity of a drive in a pair is the size of the smaller drive. RAID 5 eligible capacity of drive in an RSS of different disk sizes is not straightforward. The following algorithm simulates the process of RAID5 PSEG allocation to achieve high spindle utilization and in about three to five iterations, accurately computes eligible RAID5 capacities of the drives in a given RSS.

In accordance with this feature of the present invention, PSEGs from drives are used in rough proportion to the physical size of the drive. In other words, larger drives will contribute PSEGs more frequently than smaller drives in a given RSS. First, the total number of RStores that can be allocated in a given RSS is determined. These RStores are then distributed across PSEGs in proportion to the disk sizes so that the smaller disks do not get full quickly. This distribution also reduces the gradient in the available sizes of the disks and makes the remaining capacities more nearly equal in most cases. This initial space on the RSS is called a "chunk". After the initial distribution of RStores, the number of PSEGs each disk can allocate is determined to effect the storage allocation.

For purposes of example, this method is described in terms of allocating a RAID-5 volume, and an assumption that at least 5 disks must participate. Capacity is allocated until less than 5 disks are available in the RSS, at which point unallocated PSEGs on the remaining disk(s) cannot be used for the RSS.

The chunk size for purposes of illustration is a measure of the storage capacity, measured in terms of PSEGs, that are available for allocation in the RSS. Referring to FIG. 10A and FIG. 10B, a six disk RSS comprising disks with 10, 20, 30, 40, 50, and 60 PSEGs respectively is used for illustration. In a first iteration, the chunk size is determined by considering the five largest-capacity drives, and determining the number of PSEGs that could participate if only these drives were being used. In the example, this is 20 PSEGS per drive or 100 PSEGs. This is added to the PSEGs available in the smaller drive(s) not yet considered (i.e., 10 PSEGs) to obtain a total of 110 PSEGS. The formula for this determination in the case of an RSS comprising n−1 drives ordered from smallest ($D_0$) to largest ($D_{n-1}$) is:

Chunk_size=(5*(capacity of the smallest of the five largest drives)+(capacity of all drives other than the five largest drives)

Once the chunk size is determined, a number of RStores per disk (NRStore) is determined by dividing the Chunk size by five. In the example of FIG. 10, this yields 110/5=22. The NRStore value is truncated to provide an integer result in the particular example.

A disk ratio value (Disk_ratio) is computed for each disk by dividing the actual number of unallocated PSEGs on each disk by the remaining Chunk_size, beginning with the largest disk. In the example of FIG. 10:

TABLE 1

| Drive | Computation | Disk Ratio |
|---|---|---|
| D5 | 60/110 | 54.5% |
| D5 | 50/(110 − 20) | 55.5% |
| D3 | 40/(110 − 40) | 57.1% |
| D2 | 30/(110 − 60) | 60.0% |
| D1 | 20/(110 − 80) | 66.7% |
| D0 | 10/(110 − 100) | 100.0% |

The disk ratio is shown in Table 1 for purposes of illustration, but it need not be explicitly computed in practice. It generally represents the percentage of the disk that will be utilized to implement an RStore using only this first pass. For each disk, a disk contribution value is then determined which is the minimum of either the NRStores value, or the disk ratio multiplied by the PSEGS to allocate. For example:

TABLE 2

| Drive | Computation | Disk Contrib. |
|---|---|---|
| D5 | min(22, ((60/110)*110) | 22 |
| D5 | min(22, ((50/90)*(110 − 22)) | 22 |
| D3 | min(22, ((40/70)*(110 − 44)) | 22 |
| D2 | min(22, ((30/50)*(110 − 66)) | 22 |
| D1 | min(22, ((20/30)*(110 − 88)) | 15 |
| D0 | min(22, ((10/10)*(110 − 103)) | 7 |

Essentially, the computation illustrated in Table 2 determines the number of PSEGs to be used from each drive to implement the RSS comprising 110 PSEGs. The bold rectangles in each column of FIG. 10A illustrate the disk contribution for the first round. It can be seen that each drive has some unallocated capacity after the first pass.

A second pass is performed using the same processes to allocate remaining storage. FIG. 10B illustrates the "remaining" disk capacity in PSEGs taking into consideration the storage allocated by the first pass. As shown in FIG. 10B, D0 has 3 PSEGs, D1 has 5 PSEGs, D2 has 8 PSEGS, D3 has 18 PSEGs, D4 has 28 PSEGs and D5 has 38 PSEGs. This results in a chunk size of:

Chunk_size=(5*5)+3=28 PSEGS

Which is the amount of storage that can be allocated in this second pass, and nRStore=Int(28/5)=5

Following the processes described above for the first pass, the second pass determines that D5–D2 will each contribute 5 PSEG, D1 will contribute 3 PSEGs and D0 will contribute 2 PSEGs. These contributions are illustrated by bold rectangles in each column of FIG. 10B. At this point it has been determined that at least 110+28 or 138 of the PSEGs can be allocated to a RAID-5 storage set.

The process can be repeated iteratively until there are only four (or any number less than five) disks left with unallocated space. The sum of the allocateable PSEGs in on a given drive in all iterations, is the eligible RAID-5 capacity of that drive. Thus now we have determined the eligible capacity of all the drives for all types of data protection.

The mapping between PSEGs and RStores for a LUN 102 of any redundancy type, can now be done in a leveled manner since the eligible capacities of the drives are known. This leveled allocation ensures that at any given time during the process of allocation, the spindle utilization will be proportional to the drive eligible capacity. Thus, a pattern that is a combination of certain number of minimum PSEGs on the drives in an RSS repeats itself in a cycle having a period measured in a number of RStores per cycle. This period is a minimum number of RStore such that every drive in the RSS gets a leveled proportion of PSEGs. This periodicity can be used to simplify LUN creation. For example, a look-up table of size as small as the periodicity can be used to actually map RStores to physical drives and this can be repeated for the entire LUN. This process avoids cumbersome determination of spindle utilization after every PSEG allocation and does not in any way effect the actual mapping structures.

The pattern is quantified for an RSS having "n" drives by:

$$\# RStores/cycle = LCM\left[\sum_{D0}^{Dn} \frac{\text{eligible\_capacities}}{\text{GCD\_eligible\_capacities}}, \# PSEGS/RStore\right]$$

Using FIG. 9 as an example in which there are six equal sized disks (e.g., 20 PSEGs each), and each RStore comprises six PSEGs, this becomes:

$$\# RStores/cycle = LCM\left[\sum_{D0}^{Dn} \frac{20}{20}, 6\right]$$

as the "eligible capacity" and greatest common denominator of the capacities are the same when all drives are the same size. Hence, the number of RStores per cycle is the least common multiple of [6,6], which is 6. As shown in FIG. 9, the pattern does indeed repeat every six columns. The formula above is readily applied to more complex arrangements having any number of drives, any number of PSEGs per RSTORE, and taking into account the variation of drive capacity across members of the RSS.

Most RAID levels are inherently leveled when the minimum number of disk drives are used to form a redundancy set. The implementation algorithms spread data evenly to the various members. However, when more than the minimum number of disks is used, mapping physical disk locations to logical drives in a manner that ensures leveled data becomes more problematic. More problematic still is when drives are added to or removed from a redundancy set. Changed capacity in a redundancy set requires the movement of data between remaining members.

Prior leveling systems only considered spindle usage (i.e., the distribution of data across the physical components of a storage volume). Hence, leveling was implemented by redistributing blocks of data onto spindles with lower utilization. This is adequate where the entire capacity of a disk is allocated to a single logical device, and/or a single redundancy type. However, the virtualization system of the present invention creates an environment where a given disk may have some PSEGs that are members of a first LUN 102, and other PSEGs that are members of a separate LUN 102. A single disk drive may, in fact, contain PSEGs allocated to tens, and theoretically hundreds of LUNs 102. Moreover, a single disk may contribute storage capacity to various redundancy types. In such an environment, the potential for some drives to have more data utilization than other drives exists.

Ideal spindle utilization and I/O performance are not achieved by simply having the total amount of allocated PSEGs on the disks in proportion to the disk capacity. Additionally, physical resources for each LUN 102 should be proportionately distributed on all the eligible disks. In accordance with the present invention, each physical disk in a LDAD 103 contributes a percentage of the total LDAD capacity. The ideal goal of leveling is for every disk in the LDAD 103 to contain a percentage of every LUN 102 in the LDAD in proportion to that disks percentage of total LDAD capacity. For example, if LDAD 103 contains ten equal sized disks, then each disk would contain 10% of every LUN 102 in that LDAD 103.

A process of logical disk creation initially handles level distribution of the data stored by the LUN 102. For example, when LUN 102 is created in an LDAD having ten physical disks, an equal number of PSEGs from each physical disk can be used such that the data will be leveled. However, if one or more disks lack sufficient unallocated capacity to meet this ideal, a non-ideal distribution of PSEGs may occur for even a newly created LUN 102. When a physical disk is added or removed, each LUN 102 within the LDAD 103 will have to be redistributed to make best use of the LDAD capacity. In these cases the leveling processes in accordance with the present invention are used.

The following terminology and definitions are used in illustrating the leveling method in accordance with the present invention. An RSS or disk is "eligible" if it can allocate capacity to a LUN 102 of a redundancy type specified by that LUN 102. A given RSS or disk may be eligible for all or only some of the supported RAID types. Eligible LDAD capacity refers to the sum of capacities of all the eligible (for a given redundancy type) RSSs. Eligible RSS capacity refers to the sum of capacities of all the eligible (again, for a given redundancy type) disks. Hence, the eligible LDAD capacity is the sum of the Eligible RSS capacity. Eligible disk capacity is defined as a number of PSEGS the disk can store (for given redundancy type).

Current spindle utilization refers to metrics used to quantify a point-in-time measurement of utilization. Current RSS utilization ratio is determined by the ratio of size of a LUN 102 on the RSS to the total size of the LUN 102. Hence, RSS utilization ratio indicates how much of a LUN 102 is implemented on any given RSS. Current disk utilization ratio is a ratio of the size of a LUN 102 on a particular physical disk to the size of the LUN 102, and so indicates the proportional amount of the LUN 102 that is implemented on a particular disk.

Ideal spindle utilization refers to a set of derived target values or critical values in contrast with the current actual values discussed above. Ideal RSS utilization ratio (RSS critical ratio) is determined by dividing the eligible RSS capacity by the eligible LDAD capacity and reflects a goal that a LUN 102 is ideally spread uniformly across all of the eligible RSS capacity. An ideal disk utilization ratio (disk critical ratio) is computed by dividing the eligible DISK capacity by the eligible LDAD capacity and reflects the goal that a given LUN 102 should be spread evenly across all eligible physical disk storage capacity.

A disk or RSS is classified as "exceeding" if it currently has more RStores or PSEGs of the LUN 102 than its ideal share, within a preselected tolerance. A disk or RSS is classified as deprived when it currently has fewer RStores or PSEGs of the LUN 102 than its ideal share. A disk or RSS is classified as "content" when it currently has a number RStores or PSEGs within the preselected tolerance of ideal.

The method of the present invention involves processes that attempt to level both the RSS utilization and the disk utilization by moving data to make both current values closer to ideal values. Assuming a LUN 102 is of a given RAID type, only RSS and LDAD capacity that is capable of being used for that RAID type is relevant to the leveling algorithm. Hence, the capacity of all disks in the LDAD is determined and maintained on a type-by-type basis (e.g., 400 PSEGs available for RAID-0, 250 PSEGS available for RAID-5, etc.).

When a LUN 102 is being leveled, an ideal number of PSEGs that each physical disk should store is computed. A "critical ratio" is determined for each disk in the LDAD, and is computed for each redundancy type represented in the LDAD. This number is essentially the ratio of eligible capacity of the disk to the total eligible LDAD capacity. Hence, if only a single redundancy type is implemented in the LDAD, a disk that implements 10% of the eligible LDAD capacity should hold 10% of the PSEGs allocated to the LUN 102 being leveled.

In practice, however, the number of PSEGs in any given physical disk that can be allocated to each redundancy type will often vary. For example, a given disk may have 100 PSEGs, but none are available for RAID-1 whereas all are eligible for other RAID levels. Hence, the disk capacity for each RAID level is determined, then the eligible LDAD capacity for each RAID level is determined, and the critical ratio (disk capacity/LDAD capacity) for each RAID level is determined. These ratios are independent of a particular LUN 102.

Similarly, the ideal number of RStores that the RSS should allocate is computed. This ideal value is the sum of all the disk critical ratios for disks belonging to that RSS. By way of example, in an RSS having eight physical disks as members, the critical ratios for each of the eight members are summed for each of the supported RAID types. This summed value indicates the percentage of the RSS that is eligible to be used for storing data using the corresponding redundancy type.

After obtaining and determining the ideal distribution information about the LDAD, the LDAD can be leveled by leveling each LUN 102 in the LDAD one at a time. The LDDIR in the CSLD 111 is accessed to identify the base RSD of the PLDMC for the LUN 102 currently being leveled. The memory representation of a LUN 102 is loaded in whole or part into memory. The array of RSDM is walked so that every RStore in the LUN 102 is addressed.

Each array identifies the physical disks that actually allocate PSEGs participating in the particular RStore. As the array is walked, a counter maintained for each disk, and the counter is incremented for each PSEG allocated to an RStore. Once all the RStores represented in the map are processed, the counters indicate a distribution in terms of numbers of PSEGs used on each eligible disk. From this information, the current disk utilization ratio is determined by dividing the number of PSEGs on each disk by the eligible capacity, in PSEGs, of the LUN 102 being leveled. The current RSS utilization ratio is the sum of all the disk utilization ratios of the disks belonging to that RSS.

The preceding discussion assumes that a LUN 102 comprises only one redundancy type, which is a typical configuration. It is contemplated that a LUN may be configured with multiple redundancy types, in which case the disk and RSS utilization should be maintained on a type-by-type basis rather than on a per-RSS basis described above.

Each LUN 102 in the LDAD 103 being leveled will require about 2 Kbytes of memory to implement the leveling data structures holding the ideal and current utilization values. Because a LDAD 103 may contain many logical disks, the cumulative memory requirements may become significant. LDAD 103 is leveled one LUN at a time, hence, only the leveling data structure of the LUN 102 currently being leveled need be held in memory. However, in some cases a it may take several passes or iterations to level a given LUN 102 in that PSEGs released by leveling of subsequent LUNs 102 may be used to improve leveling of a previous LUN 102. Hence, when a LUN 102 is not completely leveled, as indicated by post-leveling metrics that show utilization outside of the preselected tolerance, the leveling data structure is preferably held in cache so that it can be reused once one or more subsequent LUNs 102 are leveled.

For a given LUN 102, leveling proceeds in essentially two steps. First, the LUN 102 is "logically leveled" across RSSs. Second, the LUN 102 is "physically leveled" to spread PSEGs across disks used by the RSS. Once the leveling data structure is completed for a LUN 102, a triage operation is performed to classify each RSS as either exceeding, content, or deprived with respect to its share of the data for the LUN 102 being considered. The disk utilization ratios are treated in a similar manner. Essentially, the current RSS and current disk utilization ratios are sorted and compared with critical ratios from the leveling data structure.

To level LUN 102 the process walks through the RSDM array (map) and determines if the RStore or its PSEGs need to be moved. If the RStore is allocated on the exceeding RSS it will move it to the most deprived RSS that has a minimum number of deprived disks with free PSEGs. Hence, for each exceeding RStore, a candidate destination RSS is identified. The candidate destination RSS is evaluated against certain criteria that indicate whether the move is efficient. The candidate RSS should have sufficient unallocated PSEGs to support the move. To justify the move, the candidate RSS should have a sufficient number of deprived disks, for example, to support the exceeding RSS.

For example, assuming RAID-1 I/O performance is optimized by spreading an RStore across eight disks, a RAID-1 LUN 102 would have its RStores ideally allocated on eight separate disks. In this case, it would not be efficient to move the RStore to an RSS that does not have eight deprived disks with sufficient free PSEGs. Other criteria may also be used in evaluating a candidate RSS. For example, the candidate destination RSS should not have already have allocated an RStore that is consecutive (preceding or succeeding) to the RStore being moved, as the adjacent RStores could not be accessed in parallel when they use the same or overlapping disks.

While walking through the RSDM array, for LD utilization information, the Rstores that have less than maximum disks participating could be marked. If these RStores are on exceeding RSS they could be first moved and then leveled.

When the RStore is allocated on the content or deprived RSS the process determines whether the LUN 102 is already leveled within that RSS. When this RSS is not leveled, the PSEGs in the RStore are moved within the RSS from exceeding to a deprived disk that has free PSEGs. If the RStore has more than one PSEG allocated on the same disk, then one of those PSEGs is moved to increase the number of disks participating in the RStore. Also the PSEG should not be moved to the disk that already has allocated a PSEG in this RStore.

Whenever an Rstore is moved across the RSSs, the RSS and disk utilization ratios are preferably re-computed for the affected RSSs and its member disks. When the PSEGs are moved within the RSS, only disk utilization ratios need be computed for the affected disks. The arrays are resorted and exceeding, content and deprived positions are determined.

In a situation where all the deprived RSSs (or their deprived member disks) are full, the LUN 102 leveling is abandoned temporarily and a bookmark is placed on the RSDM so as to enable a subsequent leveling pass to begin in from where the abandonment occurred. As subsequent LUNs 102 are leveled, capacity on the full RSSs or disks may become available enabling the leveling to continue.

It is possible that a LUN 102 is leveled across all the RSSs, but not within all the RSSs. In this case a single pass through the RSDM array will not level the LUN 102. In this case, the utilization information (i.e., leveling data structure) is maintained in cache and subsequent passes can be made to level them when PSEGs are freed on the Deprived RSSs.

While LUNs 102 are by default selected for leveling in the order they are represented in the LDDIR, in situations where a LUN 102 could not be leveled it may be advantageous to select the next LUN 102 out of order. In these situations, the next LUN 102 for leveling may be selected by walking through the PSARs of the deprived and full disk. PSARs are located in the metadata record on each disk, and comprise an identification of all LUNs 102 that are associated with PSEGs on that disk, and the size of each LUN 102 represented on the disk. Since the critical ratio of the disk is already known, and the LUN 102 size is known, it can be determine which LUN 102 has more PSEGs than its ideal proportion. By selecting this "greedy" LUN 102 for leveling next, the likelihood of creating free PSEGs that can be used to level the preceding LUN 102 is increased.

When a LUN 102 is completely leveled, the next LUN 102 (for leveling) is chosen from amongst the LUNs 102 having cached leveling data structures there was enough movement of RStores (or PSEGs) since it was last leveled. If there is no appropriate LUN 102 in this queue, the next LUN 102 is chosen from the order presented in the LDDIR. It is contemplated that for majority of cases, a LUN 102 will be successfully get leveled in its entirety before moving to the next LUN 102. The LDAD leveling is complete when all LUNs 102 in the LDDIR, and those in the list of abandoned LUNs 102, have been leveled.

The leveling method described above provides a non-deterministic process for PSEG allocation in that the binding of PSEGs to RStores occurs only at allocation time. This method levels PSEGs already allocated in an unleveled manner. However, the actual allocation of PSEGs is done by a technique to accurately predict PSEG placement in advance of actual allocation. This is useful in cases where PSEGs need to be reserved before allocation, so that those PSEGs are guaranteed to be available when needed. In this case, a deterministic method for PSEG allocation is used.

One such method involves the use of lookup tables that are generated in such a manner as to bind PSEGs to RStores well in advance of the actual allocation of those PSEGs. By querying the lookup table, one can determine the PSEG-RStore binding as needed. This lookup table is created by using the RSS and disk critical ratios described above with respect to the level algorithm. This ensures that the allocation is done in a leveled manner.

The efficient leveling mechanisms described above are particularly useful when disks are added to and removed from an RSS. Although an RSS may theoretically include any number of member disks, it has been found that data protection and I/O performance is little improved when more than about eight disks are used. At the other extreme, some protection schemes, such as RAID-5, require a practical minimum of five disks for good performance. In the past, a RAID set would be configured with a minimum number of drives and may have had excess capacity. As storage volumes grow, more disks had to be added with a resulting complexity in management and sometimes a degradation of performance.

In a preferred implementation of the present invention, a target size of about eight drives contributing to each RSS is used, although this target may vary somewhat to meet the needs of particular applications and environments. As a LDAD grows in capacity, the leveling mechanisms spread and re-spread data to ensure efficient use of the capacity. When an RSS grows larger than a desired number of drives (e.g., about twelve drives), the RSS is either migrated to another RSS having sufficient free PSEGs to implement the RSS using fewer drives, or the RSS is split into two or more smaller RSSs that will fit on fewer drives. Conversely, when an RSS shrinks to fewer than six drives it can be merged with another small RSS to create a single RSS that is closer to the target eight drive size. This automatic restructuring of the storage sets occurs invisibly to the LUNs 102 using the RSSs and fine tunes performance as storage capacities vary over time.

In operation, the mechanisms, software, firmware and data structures of the present invention enable virtualized storage with enormous flexibility. Storage capacity is realized in a manner that is essentially independent of the physical disks on which the data exists. Over very short periods of time the entire set of disks can be changed. Movement of storage location is highly fluid as are the redundancy properties associated with any stored data.

The present invention is particularly described in terms of a set of algorithms embodied as firmware running on storage controller hardware. These mechanisms are used to create and present virtual storage devices, i.e., LUNs 102, to an arbitrary set of hosts connected to the storage controller via a network connection such as a LAN, WAN, or connection directly to the storage area network (SAN) to which the physical storage devices are connected. Users request various operations via a graphical user interface (GUI) communicating using a collection of public and private protocols. In response to user requests, the storage system automatically maps storage between memory representations and on-disk media, levels data storage across both logical and physical storage structures, and quantifies storage capacity as well as allocation patterns. The present invention atomizes storage capacity in the physical domain in the form of PSEGs and in the logical domain in the form of RStores to enable fluid movement of capacity. The relationship of particular disks can be modified to provide various levels of protection and allow for construction of virtual disks with variable levels of data protection.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method of configuring a pool of physical storage disks comprising:

defining a plurality of uniquely identifiable physical segments within each member of the pool of physical storage disks; and defining a first storage set comprising a selected group of the physical segments from at least a first physical storage disk;

defining a second storage set comprising at least one group of physical segments from the first physical storage disk;

implementing a first level of data protection for the first storage set; and implementing a second level of data protection for the second storage set;

wherein the second level of data protection is different from the first level of data protection.

2. The method of claim 1 wherein the physical storage disks are of varying individual capacity.

3. The method of claim 1 wherein the physical segments have a single capacity.

4. The method of claim 1 wherein the physical segments have varying capacity.

5. The method of claim 1 wherein the physical segments comprise a plurality of sectors in each physical storage disk.

6. The method of claim 1 wherein the physical segments comprise a contiguous set of physical sectors in each physical storage disk.

7. The method of claim 1 wherein the physical segments comprise more than 1 Mbyte of storage capacity.

8. The method of claim 1 wherein the physical segments comprise less than 32 MByte of storage capacity.

9. The method of claim 1 wherein the first storage set comprises at least five physical segments.

10. The method of claim 1 wherein the first storage set comprises physical segments located on independent storage disks.

11. A method of configuring a pool of physical storage disks into a storage set comprising:

dividing the physical storage disks into a plurality of uniquely identifiable physical segments;

aggregating a first plurality of uniquely identifiable physical segments into a first redundant store entity;

assigning a first data protection level to the at least one redundant store entity;

aggregating a second plurality of uniquely identifiable physical segments into a second redundant store entity; and assigning a second data protection level, different from the first data protection level, to the second redundant store entity, wherein the first redundant storage entity and the second redundant storage entity comprise physical storage segments from a common disk drive.

12. The method of claim 11 wherein the first redundant store entity implements data protection independently of any other redundant store entity formed from the pool of physical storage disks.

13. A storage controller, comprising:

a processor; and a memory module communicatively connected to the processor and comprising logic instructions which, when executed by the processor, configure the processor to:

define a plurality of uniquely identifiable physical segments within each member of the pool of physical storage disks; and define a first storage set comprising a selected group of the physical segments from at least a first physical storage disk;

define a second storage set comprising at least one group of physical segments from the first physical storage disk;

implement a first level of data protection for the first storage set; and implement a second level of data protection for the second storage set;

wherein the second level of data protection is different from the first level of data protection.

* * * * *